No. 641,197. Patented Jan. 9, 1900.
W. M. DUCAT.
FILTER FOR PURIFYING SEWAGE, &c.
(Application filed Nov. 17, 1899.)
(No Model.) 4 Sheets—Sheet 3.

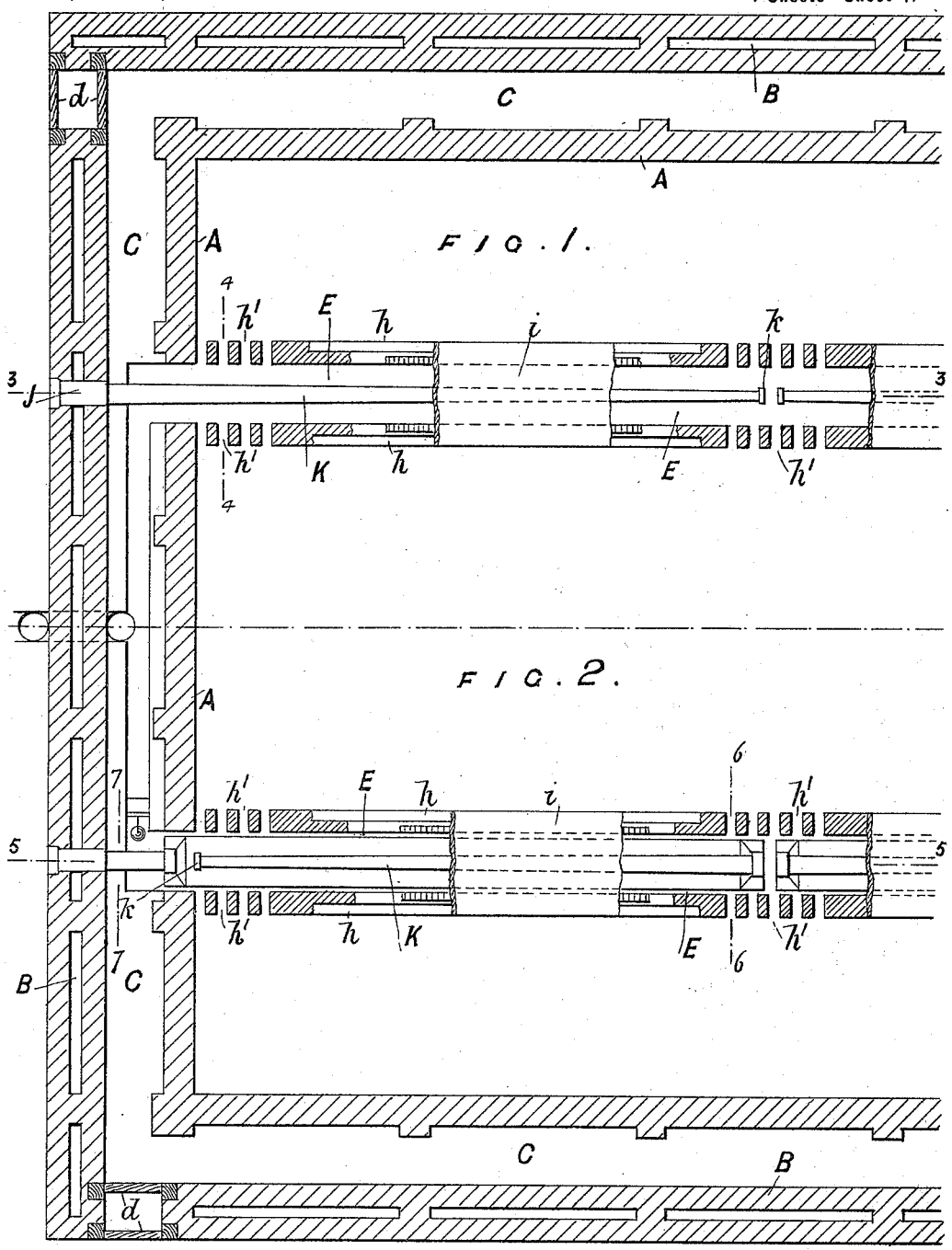

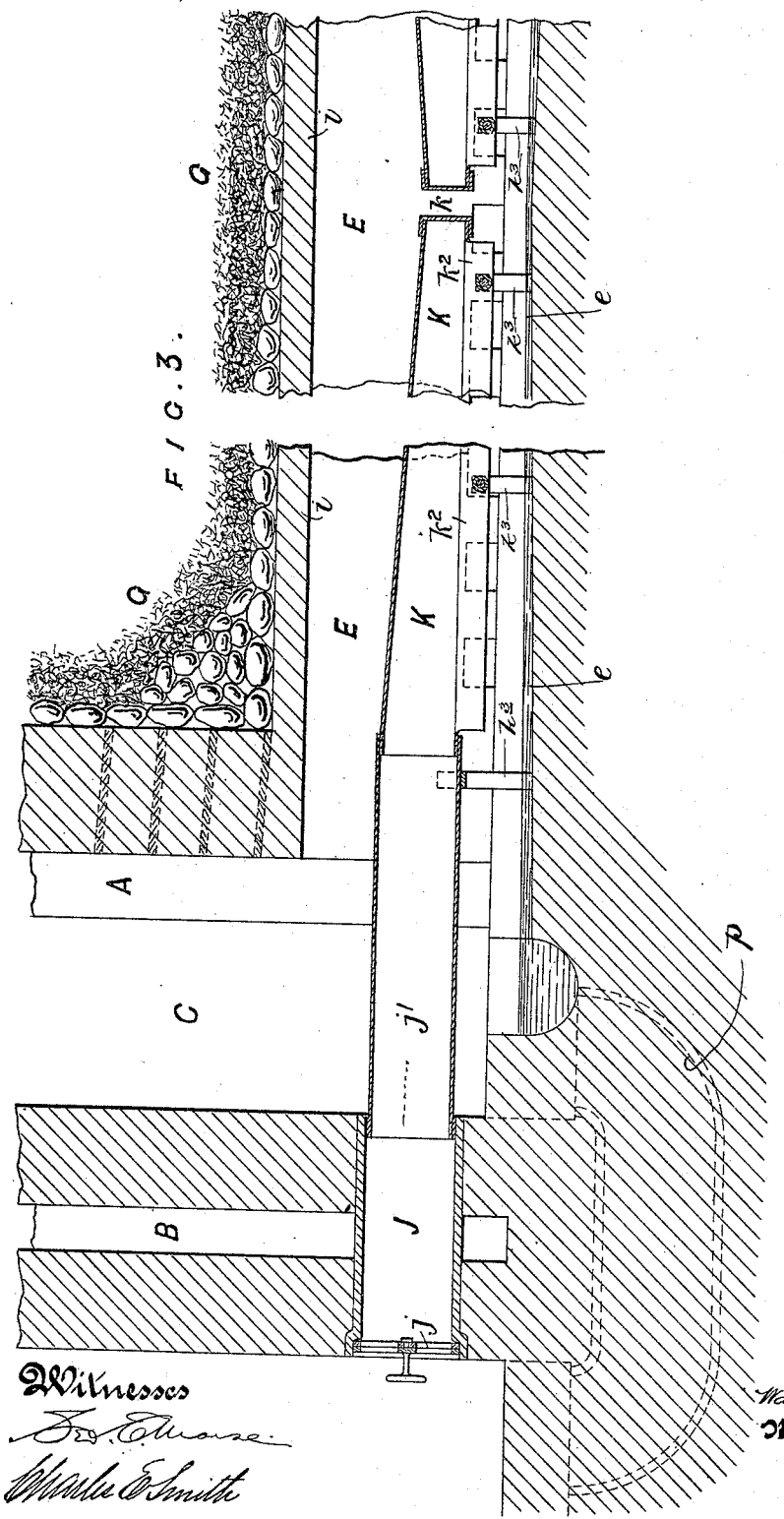

Witnesses
Inventor
Walter Mardon Ducat
By Briesen & Knauth
his Attorneys

THE NORRIS PETERS CO., PHOTO-LITHO., WASHINGTON, D. C.

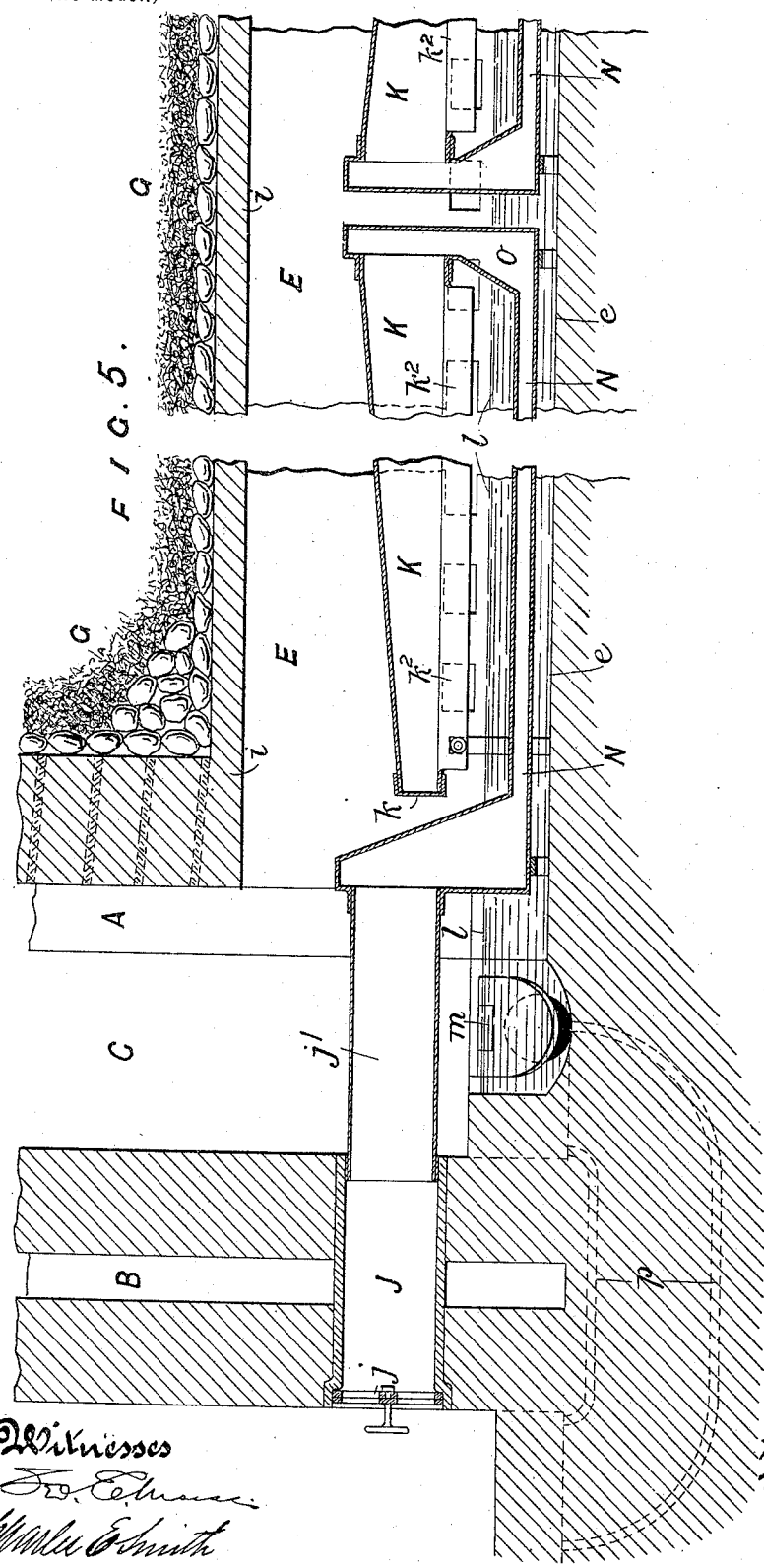

UNITED STATES PATENT OFFICE.

WALTER M. DUCAT, OF LONDON, ENGLAND.

FILTER FOR PURIFYING SEWAGE, &c.

SPECIFICATION forming part of Letters Patent No. 641,197, dated January 9, 1900.

Application filed November 17, 1899. Serial No. 737,272. (No model.)

*To all whom it may concern:*

Be it known that I, WALTER MARDON DUCAT, colonel late Royal Engineers, and a resident of 13 Devonshire Terrace, Hyde Park, London, W., England, have invented new and useful Improvements in Aerobic Bacterial Filters for the Purification of Sewage and other Waters, (for which an application for patent has been filed in Great Britain, dated February 2, 1899, No. 2,373,) of which the following is a full, clear, and exact description.

My invention relates to the purification of crude sewage and other foul waters by bacterial action, and has for its object to provide for the supply in cold weather of warmed air to the sewage passing through the mass of filtering material in the purification-chamber in order to prevent the vitality of the micro-organisms (on whose action the purification depends) being checked or arrested.

The invention is particularly applicable to the filter forming the subject of previous Letters Patent, dated July 19, 1898, No. 607,426.

It is necessary to supply large quantities of air to an aerobic bacterial filter such as referred to, but the air must be supplied at a temperature above that at which bacterial action becomes suspended, and it is therefore necessary in cold weather to provide means for warming the incoming air-supply, the temperature of which should under no circumstances be less than 37° Fahrenheit.

The present invention consists, essentially, in utilizing the heat of the effluent for the purpose of warming the air supplied to the filter, so as to prevent access of air at such a low temperature as would check satisfactory bacterial action and nitrification. This may be accomplished by causing the fresh air to be supplied to the filter to first pass through thin metal pipes laid in proximity to the effluent-collecting floor or to an effluent-channel in said floor, so as to cause the air to become warmed (before coming in contact with the filtering material) by the heat generated by bacterial action, the heat being taken from the effluent coming from the filter-bed. The fresh air so warmed may be supplied directly to the air ducts or flues within the body of the filter or to the inclosing air-space, this depending on the particular construction of filter to which my invention is applied.

The accompanying drawings, forming part of this specification, illustrate the preferred mode of carrying the invention into practice.

Figure 4:
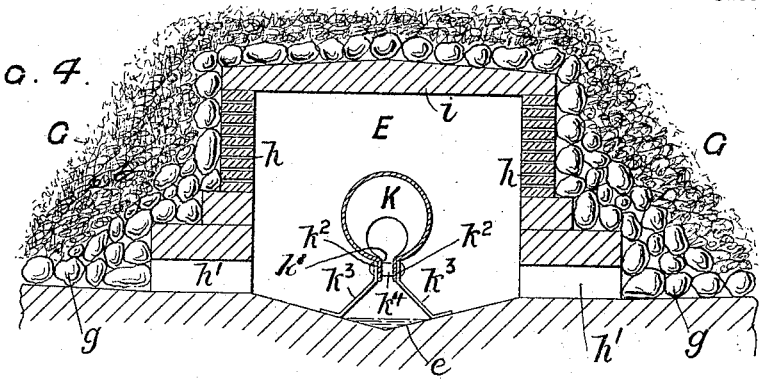
Figure 6:
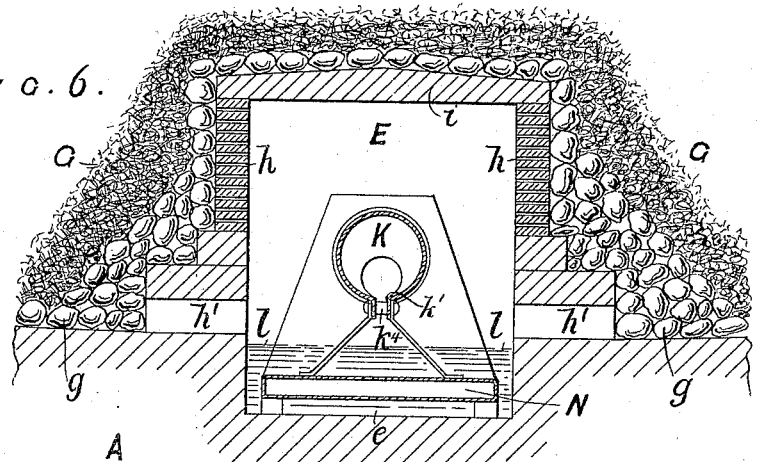
Figure 7:
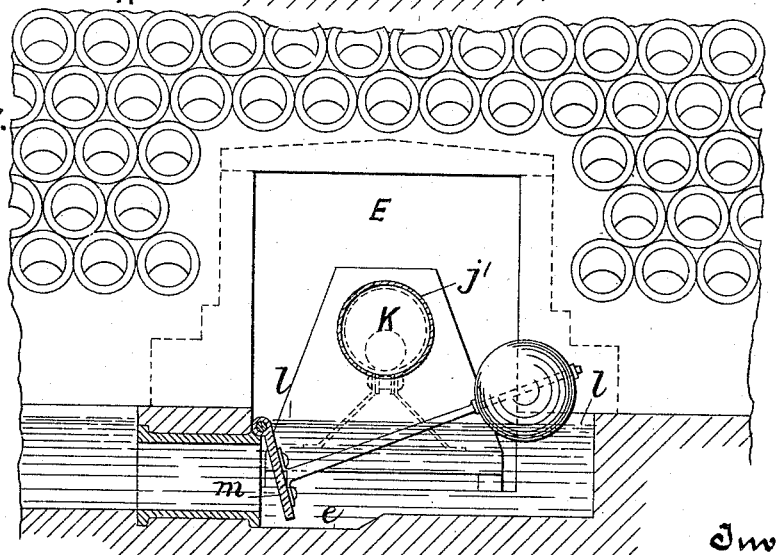

Figure 1 is a part half-horizontal section of an aerobic bacterial filter provided with my improved means of heating the air-supply, the section being taken at different levels on planes passing through the effluent-collecting and air-intake channel, while Fig. 2 is a similar section of a filter provided with means of heating the air-supply adapted more particularly for use in exceptionally cold situations. Figs. 3 and 4 are respectively vertical part sections, drawn to an enlarged scale on lines 3 3 and 4 4, Fig. 1; and Figs. 5, 6, and 7 are respectively similar sections on lines 5 5, 6 6, and 7 7, Fig. 2.

Similar letters of reference denote like parts in all the figures.

Referring to Figs. 1, 3, and 4, the filter is here shown as constructed of an apertured wall A, surrounding and containing the stratified mass of filtering material, arranged substantially as described in the specification of the Letters Patent above referred to, the apertured wall being surrounded externally at a distance of, say, about two feet by a solid wall B, which may be made double or cellular, so as to better prevent loss of heat by outward radiation. The space C between the walls A and B is roofed over and provided with double doors $d$, and the upper surface of the filter-bed is also roofed over.

In the construction now illustrated the effluent is collected, previous to its delivery outside the boundary of the filter-bed, in a channel or channels $e$, forming the bottom of air-flues E built upon the floor on which the filtering material is laid, the floor being for this purpose sloped downward toward the channel or channels $e$ from the apertured wall A, whose lower portion is made solid for a few inches in height, so as to prevent the escape of effluent around the circuit of the filter-bed. In a filter of small capacity a single passage may suffice, but usually there would be provided two or more air-flues E, each extending completely across the filter-bed and having its bottom channel $e$ inclined toward both ends from the center, so as to discharge the effluent at both ends of the filter-bed.

The construction of the air-flues E is clearly shown by the cross-sectional view, Fig. 4, the bottom channel $e$ sloping from either side toward the center and being protected from the superincumbent mass of filtering material G by side walls $h$ and a concrete, flagged, or arched roof $i$. The effluent runs into the channel through apertures $h'$, formed in the lowest part of the walls $h$, while the upper portions of these walls may be constructed of perforated bricks, as indicated, through which the air in the space above the channel $e$ is afforded access to the interior of the mass of filtering material G, which is laid upon a bottom course of large pebbles or other suitable material $g$, forming a collecting stratum for the effluent, as described in the specification of the previous Letters Patent.

Air is admitted from outside the filter through pipes J, traversing the outer wall B, one such pipe being placed opposite each end of each air-flue E. The pipe J is provided with a "hit-and-miss" valve or damper $j$, whereby to regulate the air-supply, and from the inner end of the pipe J a metal pipe $j'$ leads across the space C to a delivery-pipe K, preferably formed of sheet metal, such as zinc, which extends half-way along the air-flue E, terminating midway of the flue in a stopped end $k$, the pipe K tapering from its junction with pipe $j'$ to a diameter such as to equalize the supply of air emitted by the pipe throughout the course of its length, as hereinafter described. The bottom of pipe K is laid substantially parallel to the bottom of the effluent-channel $e$, at a height above the latter clear of the liquid flowing in the channel, the bottom of the pipe being perforated or slitted at $k'$ throughout its whole length. This bottom slit or opening $k'$ is preferably formed by outwardly bending the edges of the metal sheet of which the pipe is composed, the longitudinal flanges $k^2$, Fig. 4, thus formed serving both to stiffen the pipe and to direct the current of air downward upon the stream or film of liquid flowing along the effluent-channel. The pipe K may be supported at suitable intervals by splayed legs $k^3$, formed of metal bars bolted at their upper ends to the outer sides of the flanges $k^2$, a distance-washer $k^4$ being interposed between the flanges, so as to maintain the required width (about one-quarter of an inch, more or less) of the slit $k'$.

The only fresh air supplied to the filter is that admitted through the valves $j$ and pipes K, and it will be apparent from the foregoing description that such air necessarily takes up a considerable quantity of heat from the stream of effluent flowing in each channel $e$, since the incoming air issuing from the slit $k'$ impinges directly upon the stream of effluent at the bottom of the channel and being deflected toward either side thereof is brought into intimate contact with the film of effluent which trickles down the sloping sides of the channel $e$. Moreover, the air passing along the pipe K takes up heat by conduction through the walls of the pipe. It will be obvious that with a view to obtaining the best results the number of the air-flues E and the capacity of the pipes J and K should be duly proportioned to the quantity of fresh air required and that the channels $e$ should be laid at such an inclination and the discharge of effluent outside of the filter so regulated relatively to the quantity of crude sewage dealt with as to insure that the whole of the effluent shall remain in contact with the inflowing current of air so long as may be required to effect the desired transference of heat from the effluent to the air.

In situations where owing to the low temperature of the outer atmosphere or other reason the apparatus just described is insufficient to effect the requisite warming of the air supplied to the filter the modified arrangement illustrated in Figs. 2, 5, 6, and 7 may be employed. In this arrangement the general construction of the filter-bed and its outer wall B, the disposition of the passages E, and the construction of the walls $h$, lateral apertures $h'$, and roof $i$ of each such passage are the same as already described. The channel $e$ is, however, deepened, as shown clearly in the cross-sectional view, Fig. 6, and the stream of effluent therein is maintained at a constant level, as indicated at 1 1, by means of a float-controlled valve $m$, Fig. 7, or equivalent device. About midway in the depth of the channel $e$ is placed on suitable supports an air chamber or trunk N of shallow flat section, so as to be completely submerged in the liquid, the width of the trunk being slightly less than that of the channel, so as to permit circulation of the effluent in the channel in the vertical direction. The air entering the pipe J through the valve $j$ is led across the space C, between the walls A and B, and delivered to the outer end of the trunk N by means of a sheet-metal pipe $j'$, and after traversing the length of the trunk is delivered from the inner end thereof by a raising-pipe $o$ into the corresponding end of the tapering slitted pipe K, which is supported clear of the liquid in the channel $e$, so as to discharge the air directly onto the surface of the stream of effluent in the channel $e$, the taper of the pipe K being toward its stopped outer end $k$. The inflowing-current of fresh air is thus caused to travel in contact with the heating-surfaces through a course approximately twice as long as that provided for it in the previously-described arrangement and has its temperature raised to a considerably greater extent.

In every case the effluent should be discharged outside the wall B through a siphon-pipe, as indicated at $p$ in Figs. 3 and 5, so as to prevent the colder external air from blowing back into the inclosed space within the walls.

I claim—

1. In an aerobic bacterial filter for the purification of sewage and other waters, the combination, with the effluent-collecting floor of the filter, of air-supply pipes or ducts connecting the external atmosphere with the interior of the filter so as to cause the air-current passing to the filter-bed to be warmed by transference of heat from the stream of effluent on said floor for the purpose specified.

2. In filters for the purification of sewage and other waters by bacterial action, the herein-described means of raising the temperature of the inflowing air-supply, consisting in the combination with effluent-collecting channels traversing the floor of the filter-bed, of air-inlet pipes slitted or apertured so as to discharge the inflowing air in a thin stream onto the surface of the stream of effluent in the channels, substantially as specified.

3. In filters for the purification of sewage and other waters by bacterial action, the herein-described means of raising the temperature of the inflowing air-supply, consisting in the combination with effluent-collecting channels traversing the floor of the filter-bed, of air-inlet pipes or trunks submerged in the effluent in said channels and connecting the external air-inlet openings with ducts through which the air is delivered, for the purpose specified.

WALTER M. DUCAT.

Witnesses:
M. R. SPIER,
J. CONWAY.